United States Patent
Thotad et al.

(10) Patent No.: US 10,848,992 B2
(45) Date of Patent: Nov. 24, 2020

(54) DATA COMMUNICATION BY VIRTUAL NETWORK BOOSTING USING PROXY NODES IN WIRELESS NETWORKS

(71) Applicant: SONY CORPORATION, Tokyo (JP)

(72) Inventors: Maruthi Thotad, Bangalore (IN); Madhvesh Sulibhavi, Bangalore (IN)

(73) Assignee: SONY CORPORATION, Tokyo (JP)

( * ) Notice: Subject to any disclaimer, the term of this patent is extended or adjusted under 35 U.S.C. 154(b) by 46 days.

(21) Appl. No.: 15/675,932

(22) Filed: Aug. 14, 2017

(65) Prior Publication Data
US 2018/0242174 A1    Aug. 23, 2018

Related U.S. Application Data

(60) Provisional application No. 62/461,474, filed on Feb. 21, 2017.

(51) Int. Cl.
*H04W 24/04*    (2009.01)
*H04L 12/24*    (2006.01)
(Continued)

(52) U.S. Cl.
CPC ......... *H04W 24/04* (2013.01); *H04L 41/0668* (2013.01); *H04W 8/005* (2013.01);
(Continued)

(58) Field of Classification Search
CPC ... H04W 84/18; H04W 88/04; H04W 88/182; H04W 24/04; H04W 8/005; H04L 41/0668; H04L 67/2814
See application file for complete search history.

(56) References Cited

U.S. PATENT DOCUMENTS

| | | | |
|---|---|---|---|
| 6,957,086 B2 * | 10/2005 | Bahl | H04W 28/18 455/557 |
| 7,016,673 B2 * | 3/2006 | Reddy | H04W 4/02 455/426.2 |

(Continued)

OTHER PUBLICATIONS

Kulkarni, et al., "The BlueBooster—Mobile Bluetooth Range Expansion", International Journal of Emerging Technology and Advanced Engineering, ISSN 2250-2459, vol. 2, Issue 3, Mar. 2012, pp. 65-70.

(Continued)

*Primary Examiner* — Michael Thier
*Assistant Examiner* — Nevena Zecevic Sandhu
(74) *Attorney, Agent, or Firm* — Chip Law Group

(57) ABSTRACT

A system and method for offline data communication by virtual network boosting using proxy nodes in offline wireless networks, includes receipt of a first content by a first electronic device from a second electronic device using a first offline wireless network feature. A plurality of offline wireless network features available in a third electronic device to which the first content is to be communicated in an offline wireless network, are detected by the first electronic device. The third electronic device is located beyond an offline wireless communication range from the second electronic device. A second offline wireless network feature from the detected plurality of offline wireless network features is selected to communicate the first content to the third electronic device. The selection may be done based on a speed parameter associated with each of the detected plurality of offline wireless network features and a content-type of the first content.

16 Claims, 7 Drawing Sheets

(51) Int. Cl.
  *H04W 88/18* (2009.01)
  *H04W 8/00* (2009.01)
  *H04W 88/04* (2009.01)
  *H04W 84/18* (2009.01)

(52) U.S. Cl.
  CPC ............ *H04W 84/18* (2013.01); *H04W 88/04* (2013.01); *H04W 88/182* (2013.01)

(56) References Cited

U.S. PATENT DOCUMENTS

| | | | | |
|---|---|---|---|---|
| 7,072,983 | B1 * | 7/2006 | Kanai | ............... G06F 17/30017 |
| | | | | 707/999.102 |
| 7,577,451 | B2 | 8/2009 | Saint-Hilaire et al. | |
| 7,940,751 | B2 * | 5/2011 | Hansen | ................. H04W 28/18 |
| | | | | 370/354 |
| 2005/0226178 | A1 * | 10/2005 | Forand | .................. H04W 48/16 |
| | | | | 370/328 |
| 2007/0008925 | A1 * | 1/2007 | Dravida | ................ H04W 36/30 |
| | | | | 370/331 |
| 2008/0253298 | A1 * | 10/2008 | Bhatti | ..................... H04L 45/02 |
| | | | | 370/252 |
| 2014/0092885 | A1 * | 4/2014 | Venkatachalam | ..... H04W 76/14 |
| | | | | 370/338 |
| 2015/0150073 | A1 * | 5/2015 | Bhalerao | ................. H04L 63/20 |
| | | | | 726/1 |
| 2016/0191642 | A1 | 6/2016 | Acar | |
| 2017/0126671 | A1 * | 5/2017 | Haapanen | ............ H04B 17/318 |

OTHER PUBLICATIONS

Preetha K G, "A novel solution to the short range bluetooth communication", International Journal on AdHoc Networking Systems (IJANS), vol. 1, No. 2, Oct. 2011, pp. 13-22.

* cited by examiner

DATA COMMUNICATION BY VIRTUAL NETWORK BOOSTING USING PROXY NODES IN WIRELESS NETWORKS

CROSS-REFERENCE TO RELATED APPLICATIONS/INCORPORATION BY REFERENCE

This application claims priority to U.S. Provisional Patent Application Ser. No. 62/461,474 filed on Feb. 21, 2017, the entire content of which is incorporated herein by reference.

FIELD

Various embodiments of the disclosure relate to network communication technologies. More specifically, various embodiments of the disclosure relate to a system and method for data communication by virtual network boosting using proxy nodes in wireless networks.

BACKGROUND

Existing offline wireless network technologies are based on certain standards, such as Bluetooth, Wi-Fi, Zigbee, and the like, which have data communication limitations based on the technology design and hardware configuration. For example, each wireless network standard, such as Bluetooth or Wi-Fi, used to exchange data over short distances has its own specifications and a definite hardware and wireless network range. In certain scenarios, two devices may need to communicate data with each other in an offline wireless network. The two devices may not be in an offline wireless network range with each other. In such scenarios, it may be a challenging task to enable data communication between such devices that are not in the offline wireless network range without the use of any special and costly hardware, for example, Wi-Fi signal boosters, dedicated access points, or Wi-Fi repeaters.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for data communication by virtual network boosting using proxy nodes in wireless networks are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DESCRIPTION

Figure 1:
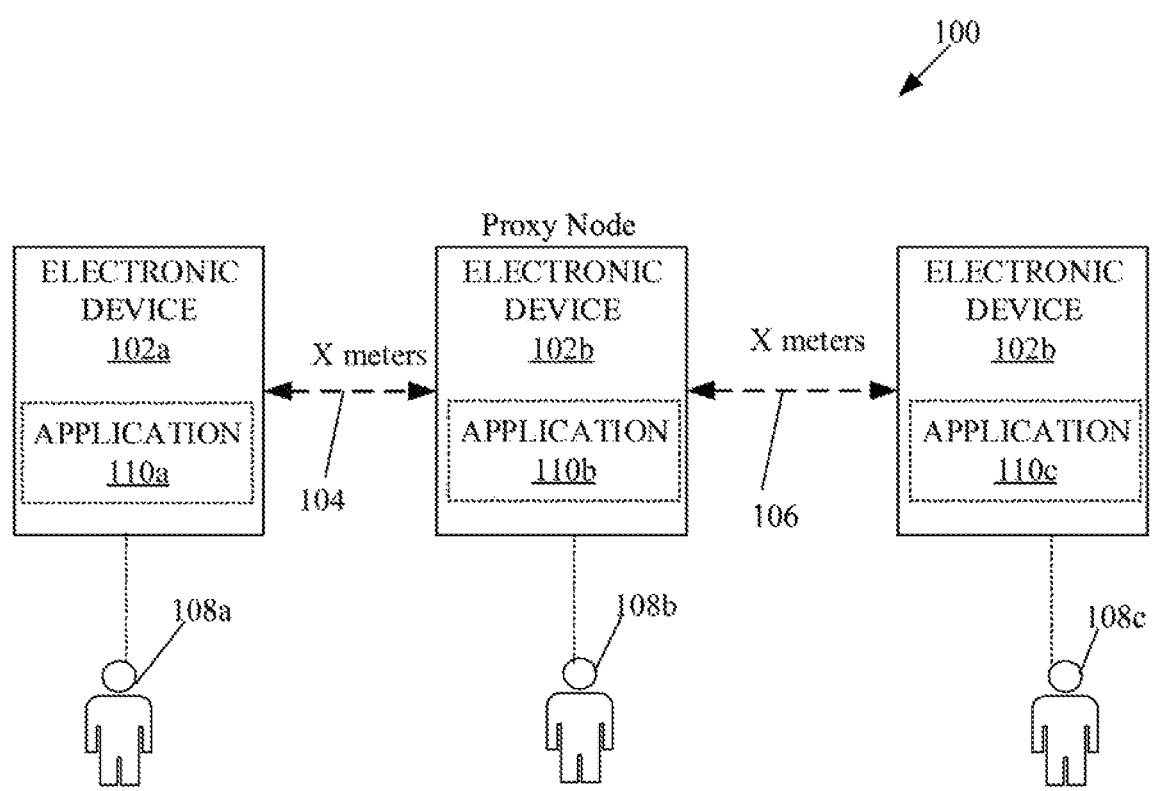
FIG. 1 illustrates an exemplary network environment for data communication by virtual network boosting using proxy nodes in wireless networks, in accordance with an embodiment of the disclosure.

The following described implementations may be found in the disclosed system and method for data communication by virtual network boosting using proxy nodes in wireless networks. Various embodiments of the disclosed system and method simplifies data communication, and enhances network coverage of network technologies, such as Bluetooth, Zigbee, and Wi-Fi beyond their standard specification. The system utilizes proxy nodes in a cost-effective manner such that even without addition of a dedicated hardware, networking capabilities of existing offline wireless network technologies may be significantly increased.

Exemplary aspects of the disclosure may include a first electronic device, which may receive a first content from a second electronic device using a first offline wireless network feature. The first electronic device may be configured to detect a third electronic device to which the first content is to be communicated in an offline wireless network. The third electronic device may be located at a distance that is beyond an offline wireless communication range from the second electronic device. The first electronic device may be configured to register itself as a proxy node in the offline wireless network. The first electronic device may be configured to detect a plurality of offline wireless network features available in the third electronic device. The first electronic device may be configured to select a second offline wireless network feature from the detected plurality of offline wireless network features to communicate the first content to the third electronic device. The selection of the second offline wireless network feature may be done based on a speed parameter associated with each of the detected plurality of offline wireless network features and a content-type of the first content. The first electronic device may be configured to communicate the first content received from the second electronic device to the third electronic device using the selected second offline wireless network feature.

In accordance with an embodiment, the first electronic device may be configured to determine the content-type of the first content received from the second electronic device. The first electronic device may be configured to encapsulate data packets of a first network-type inside a second network-type used for communication of the first content. The first network-type may correspond to the first offline wireless network feature. The second network-type may correspond to the selected second offline wireless network feature.

In accordance with an embodiment, the first electronic device may be configured to establish communication with the third electronic device using an online wireless network. The communication with the third electronic device may be established using the online wireless network based on a failure status of the detection of the third electronic device in the offline wireless network. The first electronic device may be configured to turn on one of the plurality of offline wireless network features available in the third electronic device via the online wireless network for the communication of the first content via the one of the plurality of offline wireless network features.

In accordance with an embodiment, the first offline wireless network feature may be different from the second offline wireless network feature. In some embodiments, the first offline wireless network feature may be same as the second offline wireless network feature. The first electronic device may be set as a proxy node in the offline wireless network for a two-way data exchange between the second electronic device and the third electronic device. The first electronic device may be set as a proxy node based on a presence of the third electronic device beyond the offline wireless communication range from the second electronic device.

FIG. 1 illustrates an exemplary network environment for offline data communication by virtual network boosting using proxy nodes in offline wireless networks, in accordance with an embodiment of the disclosure. With reference to FIG. 1, there is shown an exemplary environment 100. The exemplary environment 100 may include a plurality of electronic devices, such as electronic devices 102a, 102b, and 102c, a first offline wireless communication network 104, a second offline wireless communication network 106, and a plurality of users, such as users 108a, 108b, and 108c. Each of the electronic devices 102a, 102b, and 102c may include a smart network application, such as applications 110a, 110b, and 110c, as shown.

Each of the plurality of electronic devices, such as electronic devices 102a, 102b, and 102c, may include suitable logic, circuitry, and/or code for offline communication with other electronic devices, via one or more offline communication networks. The user 108a may correspond to a user of the electronic device 102a. The user 108b may correspond to a user of the electronic device 102b and the user 108c may correspond to a user of the electronic device 102c. Examples of the plurality of electronic devices, such as electronic devices 102a, 102b, and 102c, may include, but not limited to, a smartphone, a wearable device, a tablet computer, a laptop, a personal computer, a television, a speaker system, a camera, a computing device, and the like.

The first offline wireless communication network 104 may be a medium that may facilitate a communication between a second electronic device (such as the electronic device 102a) and a first electronic device (such as the electronic device 102b). The second offline wireless communication network 106 may be a medium that may enable communication between the first electronic device (such as the electronic device 102b) and a third electronic device (such as the electronic device 102c). The first offline wireless communication network 104 and the second offline wireless communication network 106 may be implemented by one or more offline wireless communication technologies known in the art. Examples of offline wireless communication networks may include, but not be limited to, a wireless personal area network (WPAN), such as Bluetooth based network, a Wireless-Fidelity (Wi-Fi) based network, a Light-Fidelity (Li-Fi) based network, Zigbee, a near field communication (NFC), a Wi-Max based network, a short-range or medium-range wireless communication network, and/or variants thereof.

Each smart network application, such as the applications 110a, 110b and 110c, comprise suitable logic and/or code that may be configured to act as a proxy node to facilitate two-way data communication between two electronic devices, such as the electronic devices 102a and 102c. For example, the application 110b installed in the electronic device 102b may act as the proxy node to facilitate two-way data communication between two electronic devices, such as the electronic devices 102a and 102c. Each of the applications 110a, 110b and 110c, may include software wrapper layers programmed over existing offline network feature stacks, such as Bluetooth, Wi-Fi, Wi-Fi-direct stacks to enhance network coverage of existing offline network features, such as Bluetooth, Wi-Fi, Wi-Fi-direct, or Zigbee, beyond their standard specifications.

Various factors may determine an offline wireless communication range of various offline wireless network features, based on the technology design and hardware configurations as specified in technology standards. The various factors that determine the offline wireless communication range may include, for example: a) a specific communication protocol executed by a particular offline wireless network feature; b) a strength of a device transmitter in the electronic device, and the nature of physical obstructions; and c) a radio interference in the surrounding area that defines the coverage area (i.e. the offline wireless communication range of that particular offline wireless network feature). For example, a typical Wi-Fi range using traditional 2.4 GHz band varies from 10 to 50 meters (m) in indoor environment and about 10 to 92 meters in outdoor environment. Typical Wi-Fi range using traditional 5 GHz bands may even be smaller than the 2.4 GHz band. Thus, different variants of IEEE 802.11 (such as 802.11, 802.11b, 802.11c, and the like) may vary in offline communication range as prescribed in standards or technology specifications. Similarly, depending on Bluetooth version or class type, the Bluetooth network range may vary from 10 to 240 meters subject to indoor or outdoor environment conditions. Further, Bluetooth protocol operates on a master-slave model known in the art, where usually one master device is limited to communicate with up to seven slave devices in a piconet. For the sake of brevity and understanding, consider that all the electronic devices 102a, 102b, and 102c comprise both the Bluetooth and Wi-Fi offline network features, where the maximum Bluetooth range in the indoor environment condition is "X" meters (m), for example, 40 meters, and a maximum Wi-Fi range in the same indoor environment condition is "Y" meters (m), for example, 50 m.

Thus, the first electronic device (such as the electronic device 102b) may be within an offline wireless communication range of the second electronic device (such as the electronic device 102a). The third electronic device (such as the electronic device 102c) may be located at a distance (for example, 80 meters in this case) that is beyond the offline wireless communication range (e.g., maximum Bluetooth or Wi-Fi range as per standard specifications) from the second electronic device (such as the electronic device 102a). In certain scenarios, the user 108a of the second electronic device (such as the electronic device 102a) may need to communicate data with the third electronic device (such as the electronic device 102c) located beyond the offline wireless communication range, for example, Bluetooth or Wi-Fi range as per existing standards, in an offline wireless network (not Internet).

In operation, each of the plurality of electronic devices, such as the electronic devices 102a, 102b, and 102c, may generate a unique identifier, by use of corresponding applications 110a, 110b, and 110c. For example, the electronic device 102a may generate a unique identifier "E0001" by use of the application 110a. The electronic device 102b may generate a unique identifier "E0002" by use of the application 110b. Similarly, the electronic device 102c may generate a unique identifier "E0003" by use of the application 110c. In some embodiments, the plurality of users, such as users 108a, 108b, and 108c, associated with the plurality of electronic devices may register their electronic device by use of the applications 110a, 110b, and 110c. The registration may be a one-time activity, and once registered a group of registered electronic devices may be created. The group of registered electronic devices may represent the users who have provided consent to be a part of an offline data communication service.

In accordance with an embodiment, each of the plurality of electronic devices, such as the electronic devices 102a, 102b, and 102c, may scan for a plurality of offline wireless network-features enabled devices in their vicinity. For example, nearby devices with Bluetooth, Wi-Fi, or NFC-enabled devices, may be searched by use of the applications 110a, 110b, and 110c. Further, each of the plurality of electronic devices, such as the electronic devices 102a, 102b, and 102c, may be configured to compute a distance with respect to each other based on a signal strength detected at the time of the scan. For example, the second electronic device (such as the electronic device 102a) may be at a distance of "X" meters (for example, 40 m) from the first electronic device (such as the electronic device 102b). The first electronic device (such as the electronic device 102b) may be located at a distance of "X" meters (for example, 40 m) from both the second electronic device (such as the electronic device 102a) and the third electronic device (such as the electronic device 102c).

The second electronic device (such as the electronic device 102a) may comprise certain offline wireless network features, such as Bluetooth. In some embodiments, the second electronic device (such as the electronic device 102a) may be configured to detect, by use of the application 110a that the first electronic device (such as the electronic device 102b) comprises unique identifiers of the second electronic device (such as the electronic device 102a) and the third electronic device (such as the electronic device 102c). The presence of unique identifiers in the first electronic device (such as the electronic device 102b) indicate that the first electronic device is within the offline wireless communication range of both the source device (i.e. the electronic device 102a from which a first content is to be communicated) and a target device (i.e. the electronic device 102c to which the first content is to be communicated). Thus, the second electronic device (such as the electronic device 102a) may be configured to select the first electronic device (such the electronic device 102b) as a proxy node for offline data communication.

In some embodiments, the second electronic device (such as the electronic device 102a) may be configured to generate a distance map, by use of the application 110a. The distance map may include a distance of the electronic device 102a with respect to other nearby electronic devices, such as the electronic device 102b. The distance may be computed based on the signal strength detected from other nearby electronic devices at the time of the scan. Similarly, distance maps may be generated by each of the plurality of electronic devices. Each of the plurality of electronic devices, may share, sync, and thereby update their distance map with other nearby electronic devices within their offline communication range, by use of their respective applications 110a to 110c. The distance map may also include a number of devices (represented for example as unique identifiers) accessible to each of the plurality of electronic devices. The second electronic device (such as electronic device 102a) may be configured to select one or more proxy nodes based on the updated distance map to communicate a first content to the target device, such as the electronic device 102c. For example, based on the updated distance map, the second electronic device (such as electronic device 102a) may be configured to detect that the end recipient device, such as the electronic device 102c, is accessible to the electronic device 102b. Thus, the electronic device 102a may be configured to select the electronic device 102b as a proxy node to communicate the first content.

In accordance with an embodiment, the first electronic device (such as the electronic device 102b) may be configured to receive the first content from the second electronic device (such as the electronic device 102a) using a first offline wireless network feature, such as Bluetooth. The first electronic device (such as the electronic device 102b) may be configured to detect the third electronic device (such as the electronic device 102c) to which the first content is to be communicated in an offline wireless network. The first electronic device (such as the electronic device 102b) may be configured to detect the third electronic device based on an analysis of the received first content. The received first content may also include an appended metadata, which may comprise a unique identifier of the target device (i.e. the third electronic device in this case) to which the first content is to be communicated. As the first electronic device (such as the electronic device 102b) also includes the unique identifier of the target device, the first electronic device may be configured to register and set itself as the proxy node by use of the application 110b in the offline wireless network. The application 110b installed in the first electronic device acts as the actual proxy node to facilitate a two-way data exchange between the second electronic device and the third electronic device. The application 110b installed in the first electronic device acts as the proxy node when the first electronic device (such as the electronic device 102b) detects that the unique identifier (e.g. E0003) of the third electronic device (such as the electronic device 102c) is absent in the second electronic device (such as the electronic device 102b). Further, the application 110b installed in the first electronic device acts as the proxy node when the second electronic device (i.e. a source of the first content) is located at a distance beyond the offline wireless communication range from the third electronic device (i.e. end receipt of the first content).

The first electronic device (such as the electronic device 102b) may be configured to determine the content-type of the first content received from the second electronic device (such as the electronic device 102a). For example, the content type of the first content may be determined as audio. Further, the first electronic device (such as the electronic device 102b) may be configured to detect a plurality of offline wireless network features available in the third electronic device (such as the electronic device 102c). The first electronic device (such as the electronic device 102b) may be configured to select a second offline wireless network feature from the detected plurality of offline wireless network features to communicate the first content to the third electronic device (such as the electronic device 102c). The selection of the second offline wireless network feature may be done based on a speed parameter associated with each of the detected plurality of offline wireless network features and the determined content-type of the first content. Alternatively stated, the second electronic device may be configured to select, by use of the application 110b, a suitable and fastest network feature based on the determined content-type and device capabilities related to availability of offline wireless network features.

In some embodiments, in cases where the first content is received by the first electronic device (such as the electronic device 102b) using the first offline wireless network feature, such as Bluetooth, the other offline wireless network feature, such as Wi-Fi, of the first electronic device may be in a disabled state. However, when the second electronic device detects by use of the application 110b that the third electronic device have both the Bluetooth and Wi-Fi network features, the second electronic device (such as the electronic device 102b) may automatically enable its Wi-Fi network feature for offline data communication. Thereafter, the second offline wireless network feature, such as Wi-Fi, is selected as a communication medium to communicate the first content.

In accordance with an embodiment, the first electronic device (such as the electronic device 102b) may be configured to encapsulate data packets of a first network-type inside a second network-type. The first network-type may correspond to the first offline wireless network feature. The second network-type may correspond to the selected second offline wireless network feature used for communication of the first content. For example, in this case data packets of Bluetooth network-type may be encapsulated inside Wi-Fi network-type to enable final communication of the first content using the Wi-Fi network feature (i.e. the selected second offline wireless network feature).

In accordance with an embodiment, the first electronic device (such as the electronic device 102b) may be configured to communicate the first content received from the second electronic device (such as the electronic device 102a) to the third electronic device (such as the electronic device 102c) using the selected second offline wireless network feature. Thus, for the existing offline networking technologies, such as Bluetooth, ZigBee, Wi-Fi-direct, Wi-Fi, NFC, and the like, smart network applications, such the applications 110a, 110b, and 110c, may be configured such that one or more of the applications 110a, 110b, and 110c acts as one or more proxy nodes to provide offline data communication between end to end devices providing more coverage area than existing standard defined range. For example, the second electronic device (such as the electronic device 102a) is able to communicate data to third electronic device (such as the electronic device 102c, which is at 2× meters (for example 80 meters) distance from the electronic device 102a) even though standard Bluetooth or Wi-Fi features (currently available in the second electronic device) typically does not support an offline communication range beyond the range specified in standards. The offline communication range or the coverage area is expanded, for example, doubled (2×), without any additional hardware requirement, such as relay boosters, signal boosters, and the like. This offline data communication by the group of registered devices (or users) using Bluetooth/Wi-Fi-direct beyond the restricted coverage area (or communication range) may find application in a local area offline communication, for example, sharing of images, audio, video, an offline chat messenger, in an organization, an apartment, registered communities, and the like. Further, with one intermediate device or proxy node, such as the first electronic device (i.e. the electronic device 102b), the existing offline network technologies capacity can be doubled with respect to their current standards. If more electronic devices are used as proxy nodes (or proxy agents), then the coverage area may increase proportionally to number of the proxy nodes used. An example related to use a plurality of proxy nodes, is described, for example, in FIG. 3.

Figure 2:
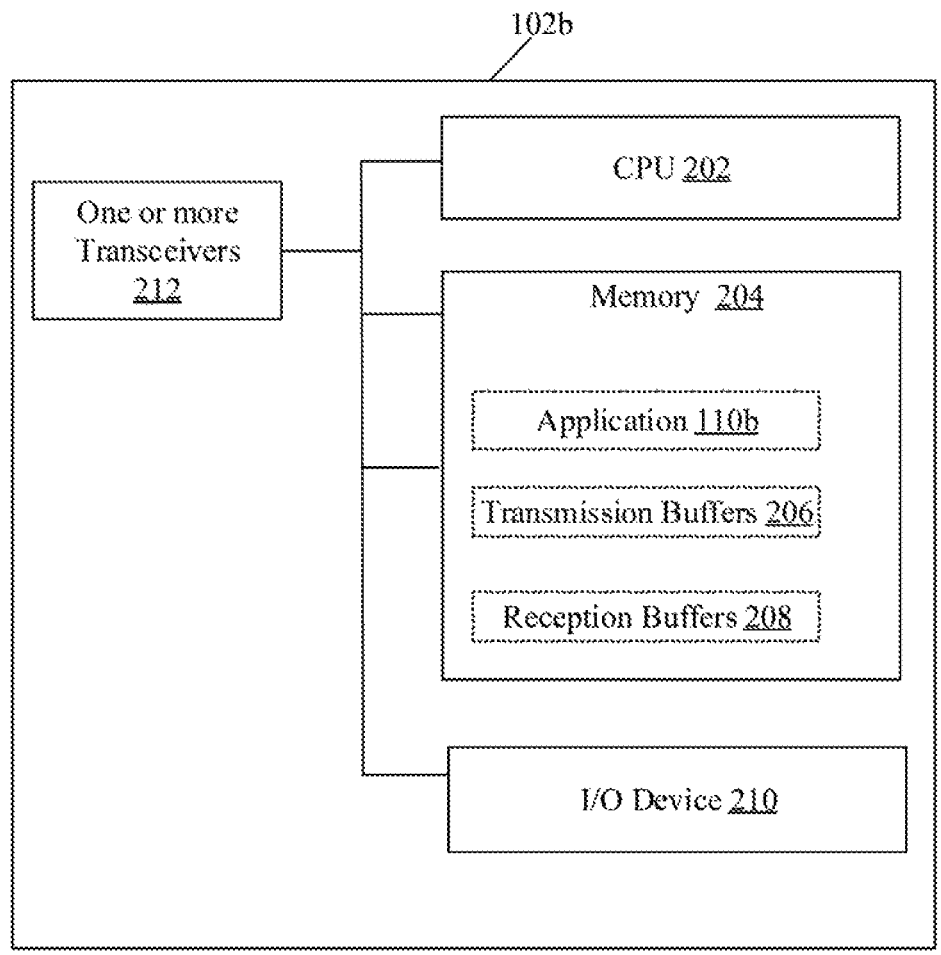
FIG. 2 is a block diagram that illustrates an exemplary electronic device for data communication by virtual network boosting using proxy nodes in wireless networks, in accordance with an embodiment of the disclosure.

FIG. 2 is a block diagram that illustrates an exemplary electronic device for offline data communication by virtual network boosting using proxy nodes in offline wireless networks, in accordance with an embodiment of the disclosure. FIG. 2 is explained in conjunction with elements from FIG. 1. With reference to FIG. 2, there is shown a first electronic device, such as the electronic device 102b. The first electronic device, such as the electronic device 102b, may include a central processing unit (CPU) 202 and a memory 204. The memory 204 may include transmission buffers 206 and reception buffers 208. The electronic device 102b may further include an input/output (I/O) device 210 and one or more transceivers 212. The application 110b may be installed in the memory 204. There is further shown one or more transceivers 212 provided in the electronic device 102b.

In accordance with an embodiment, the one or more transceivers 212 of the electronic device 102b may facilitate communication with other electronic devices, such as the electronic devices 102a and 102c. The CPU 202 may be communicatively coupled to the memory 204, the I/O device 210, and/or the one or more transceivers 212, via a system bus. A person of ordinary skill in the art may understand that the second electronic device (such as the electronic device 102a) and the third communication device (such as the electronic device 102c), may be similar to the first electronic device (such as the electronic device 102b). Hence, the aforementioned electronic devices may have similar components and functionality as that described with reference to the electronic device 102b in FIG. 2.

The CPU 202 may comprise suitable logic, circuitry, interfaces, and/or code that may be configured to execute a set of instructions stored in the memory 204. The CPU 202 may be configured to execute a set of instructions by use of the application 110b installed in the memory 204. The CPU 202 may be implemented, based on a number of processor technologies known in the art. Examples of the CPU 202 may be an X86-based processor, a Reduced Instruction Set Computing (RISC) processor, an Application-Specific Integrated Circuit (ASIC) processor, a Complex Instruction Set Computing (CISC) processor, a microcontroller, a microprocessor, and/or other processing circuitry or control circuits.

The memory 204 may comprise suitable logic, circuitry, and/or interfaces that may be configured to store a set of instructions executable by the CPU 202. The memory 204 may be further configured to temporarily store one or more data packets associated with ongoing offline data communication handled by the electronic device 102b. The memory 204 may further store data related to the application 110b. For instance, the memory 204 may store a list of registered devices, distance among devices, and unique identifiers in association with each other. Examples of implementation of the memory 204 may include, but not limited to, Random Access Memory (RAM), Read Only Memory (ROM), Hard Disk Drive (HDD), a solid state drive (SSD), and/or a Secure Digital (SD) card.

The transmission buffers 206 and the reception buffers 208 may correspond to dedicated portions of the memory 204, which may be reserved to store data related to offline data communication. For instance, the reception buffers 208 may be used to temporally store data packets received from the second electronic device (such as the electronic device 102a). Similarly, the transmission buffers 206 may be used to temporally store and prepare data packets for communication to other electronic device, such as other proxy nodes or the end recipient device, for example, the electronic device 102c. In accordance with an embodiment, the transmission buffers 206 and the reception buffers 208 may be implemented as memory registers created by the application 110b that may belong to a portion of the memory 204.

The I/O device 210 may comprise suitable logic, circuitry, interfaces, and/or code for various input and output devices that may be configured to communicate with the CPU 202. The I/O device 210 may be configured to receive an input from the user 108b. The input from the user 108b may correspond to a command to initiate offline data communication. In addition, the user 108b may provide an input to operate one or more applications, such as the application 110b, of the electronic device 102b. Examples of the input devices may include, but are not limited to, an imaging unit, a camcorder, a touch screen, a keyboard, a mouse, a joystick, a microphone, a motion sensor, a light sensor, and/or a docking station. In accordance with an embodiment, the I/O device 210 may also include one or more front-facing or rear-facing cameras that may be used to record video feeds of a user or other objects around the user. The I/O device 210 may also be configured to provide an output to the user 108b. The output may also be associated with the application 110b operated on the electronic device 102b. Examples of the output devices may include, but may not be limited to, a display screen, a projector screen, and/or a speaker.

The application 110b comprise suitable logic, and/or code that may be configured to act as a proxy node to facilitate two-way data communication between two electronic devices, such as the electronic devices 102a and 102c. In accordance with an embodiment, the application 110b may include intermediate software component installed in the memory 204. In some embodiments, the application 110b may be implemented as software wrapper layers programmed over existing offline network feature stacks, such as Bluetooth/Wi-Fi-direct stacks. In accordance with an embodiment, the functionalities of the application 110b may be implemented as a part of the CPU 202.

The one or more transceivers 212 may comprise suitable logic, circuitry, interfaces, and/or code that may be configured to communicate with other electronic devices, in various offline communication networks, such as the first offline wireless communication network 104 and the second offline wireless communication network 106. The one or more transceivers 212 may implement known technologies to support wireless communication. The one or more transceivers 212 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The one or more transceivers 212 may communicate via offline and online wireless communication with networks, such as the Internet, an Intranet, and/or a wireless network, such as a cellular telephone network, a wireless local area network (WLAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

The functions and/or operations performed by the electronic device 102b, as described in FIG. 1, may be performed by the CPU 202. Other operations performed by the CPU 202 are further described, for example, in FIGS. 3, 4A, 4B, and 5.

Figure 3A:
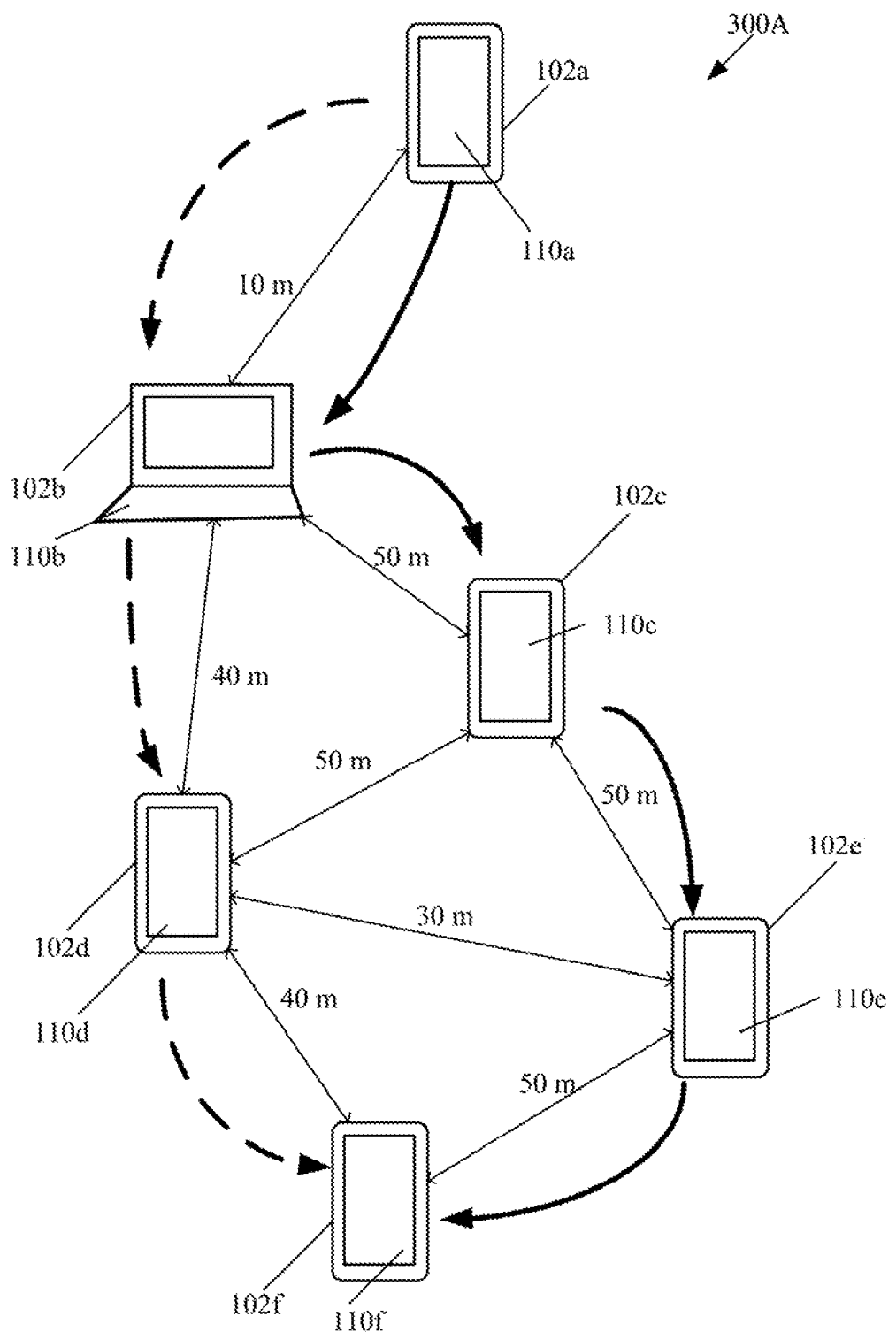
FIG. 3A illustrates a first exemplary scenario for implementation of the disclosed system and method for data communication by virtual network boosting using proxy nodes in wireless networks, in accordance with an embodiment of the disclosure.

FIG. 3A illustrates a first exemplary scenario for implementation of the disclosed system and method for offline data communication by virtual network boosting using proxy nodes in offline wireless networks, in accordance with an embodiment of the disclosure. With reference to FIG. 3A, there is shown an exemplary scenario 300A. The exemplary scenario 300A may include the plurality of electronic devices, such as electronic devices 102a, 102b, 102c, 102d, 102e, and 102f. Each of the plurality of electronic devices may include a smart network (SN) application, such as the applications 110a, 110b, 110c, 110d, 110e, and 110f.

In accordance with the exemplary scenario, the electronic devices 102a, 102c, 102d, 102e, and 102f may be a smartphone. The electronic device 102b may be a laptop. The distances (in meters) between the plurality of electronic devices, such as electronic devices 102a, 102b, 102c, 102d, 102e, and 102f, is shown in the FIG. 3A.

In operation, the electronic device 102a may be configured to generate a unique identifier, by use of the application 110a. Similarly, each of the other electronic devices, such as the electronic devices 102b, 102c, 102d, 102e, and 102f may also generate a unique identifier, by use of corresponding applications 110b, 110c, 110d, 110e, and 110f. The electronic device 102a may be configured to scan, by use of the application 110a, a plurality of offline wireless network-features enabled devices in the vicinity of the electronic device 102a. The electronic device 102a may be configured to generate a distance map, by use of the application 110a. Thereafter, the electronic device 102a may be configured to select one or more proxy nodes based on the generated distance map. An exemplary distance map is depicted in Table 1.

TABLE 1

An updated distance map

| Device_Name | Unique_Identifier | User_name | Accessible_to | Distance_to |
|---|---|---|---|---|
| Electronic device 102a | E0001 | XXA | E0002 | E0002: 10 m |
| Electronic device 102b | E0002 | XXB | E0001; E0003; E0004 | E0001: 10 m; E0003: 50 m; E0004: 40 m; |
| Electronic device 102c | E0003 | XXC | E0002; E0004; E0005 | E0002: 50 m; E0004: 50 m; E0005: 50 m |
| Electronic device 102d | E0004 | XXD | E0002; E0003; E0005; E0006 | E0002: 40 m; E0003: 50 m; E0005: 30 m; E0006: 40 m |

TABLE 1-continued

An updated distance map

| Device_Name | Unique_Identifier | User_name | Accessible_to | Distance_to |
|---|---|---|---|---|
| Electronic device 102e | E0005 | XXE | E0003; E0004; E0006 | E0003: 50 m; E0004: 30 m; E0006: 50 m |
| Electronic device 102f | E0006 | XXF | E0004; E0005 | E0004: 40 m; E0005: 50 m |

The distance map may include a distance of the electronic device 102a with respect to other nearby electronic devices, such as the electronic device 102b, within the offline communication range of the electronic device 102a (e.g. E0002: 10 m). The distance may be computed based on a signal strength detected from other nearby electronic devices at the time of the scan. Similarly, distance maps may be generated by each of the plurality of electronic devices, such as the electronic devices 102b to 102f. In accordance with an embodiment, each of the plurality of electronic devices, such as the electronic devices 102a to 102f, may share and sync their distance map with other nearby electronic devices within their offline communication range, by use of their respective applications 110a to 110f. An example of the updated distance map is shown in TABLE 1. The generated distance map in each of the plurality of electronic devices may be continuously or periodically updated. In some embodiments, the distance map may also include a number of devices (represented as unique identifiers) accessible (e.g. as shown in column "accessible_to" of TABLE 1) to each of the plurality of electronic devices, as shown in the TABLE 1.

The electronic device 102a may be further configured to communicate a first content to the end recipient device, such as the electronic device 102f, via the selected proxy nodes, such as the electronic devices 102b and 102d. The first content may be communicated by a shortest communication path (E0001→E0002→E0004→E0006) based on the intelligent selection of the proxy nodes based on the updated distance map. An identifier metadata may be generated based on the selection of the proxy nodes. The identifier metadata may include the unique identifiers of the electronic devices selected as the proxy nodes and the unique identifier of the end recipient device (such as the electronic device 102f) in a sequence (E0001→E0002→E0004→E0006).

In accordance with an embodiment, the CPU 202 of the electronic device 102b may be configured to receive the first content from the electronic device 102a using a first offline wireless network feature, such as Bluetooth or Wi-Fi. The first content may be received via the one or more transceivers 212. The first content may be received without any manual intervention by the user 108b of the electronic device 102b. The received content may be temporarily stored in the reception buffers 208 of the memory 204. The data present in the reception buffers 208 may be in encrypted form and inaccessible by the electronic device 102b. The received first content may also include the identifier metadata. Based on the analysis of the identifier metadata, the CPU 202 may be configured to set the electronic device 102b as a proxy node, by use of the application 110b. The application 110b installed in the first electronic device acts as the actual proxy node to forward the received first content to next electronic device. As the unique identifier of the end recipient device, such as electronic device 102f, is beyond the offline wireless communication range of both the electronic devices 102a and 102b, the electronic device 102b may be configured to further communicate the received first content to another proxy node. The CPU 202 of the electronic device 102b may be configured to detect the electronic device 102d to which the first content is to be further communicated. Based on the distance map, the electronic device 102b may be configured to determine that the electronic device 102d may act as another proxy node based on a presence of the unique identifier of the end recipient device (such as the electronic device 102f) in the electronic device 102d.

In accordance with an embodiment, the CPU 202 of the electronic device 102b may be configured to detect a plurality of offline wireless network features available in the electronic device 102d. The CPU 202 may be configured to select a second offline wireless network feature from the detected plurality of offline wireless network features to communicate the first content to the electronic device 102d. The selection of the second offline wireless network feature may be done based on a speed parameter associated with each of the detected plurality of offline wireless network features and the content-type of the first content.

In accordance with an embodiment, the CPU 202 of the electronic device 102b may be configured to encapsulate data packets of a first network-type inside a second network-type that is used for communication of the first content, by use of the application 110b. The first network-type may correspond to the first offline wireless network feature. The second network-type may correspond to the selected second offline wireless network feature. The CPU 202 may be configured to further communicate the first content received from the electronic device 102a to the electronic device 102d. The electronic device 102d in turn may further communicate the received first content to the end recipient device (such as the electronic device 102f) using a third offline wireless network feature, such as Wi-Fi direct.

In certain scenarios, certain offline network feature, such as Wi-Fi, may be disabled in the electronic device 102d. In such scenarios, the CPU 202 of the electronic device 102b may be configured to first establish communication with the electronic device 102d using an online wireless network. The communication with the electronic device 102d may be established using the online wireless network based on a failure status of the detection of the electronic device 102d for the offline network feature, such as Wi-Fi network. For example, the failure status may occur for unregistered devices i.e. the devices not yet a part of an offline data communication service or when registered proxy nodes supporting the offline data communication are not switched on for certain offline network features, for example, Bluetooth or Wi-Fi. The electronic device 102b may be configured to turn on one of the plurality of offline wireless network features (such as Wi-Fi network) available in the electronic device 102d, via the online wireless network, and then communicate the first content via the enabled offline wireless network feature. In other words, even if some intermediate proxy nodes supporting the offline data communication are not switched on for Bluetooth or Wi-Fi, the SN application, such as the application 110b, can reach out to these proxy nodes from Internet and enable Bluetooth or Wi-Fi, and then can start offline network communications.

Figure 3B:
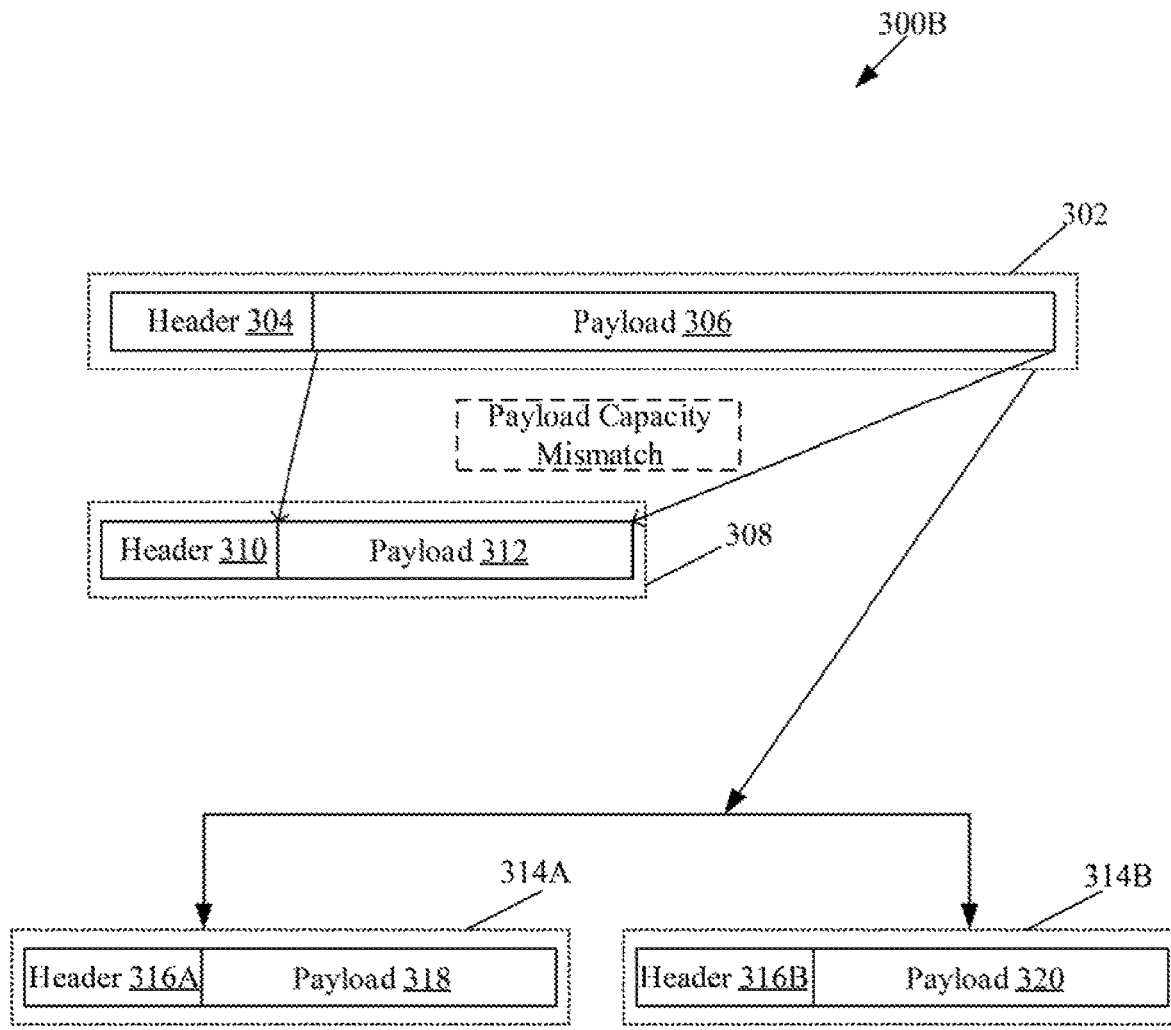
FIG. 3B illustrates a second exemplary scenario for implementation of the disclosed system and method for data communication by virtual network boosting using proxy nodes in wireless networks, in accordance with an embodiment of the disclosure.

FIG. 3B illustrates a second exemplary scenario for implementation of the disclosed system and method for data communication by virtual network boosting using proxy nodes in offline wireless networks, in accordance with an embodiment of the disclosure. With reference to FIG. 3B, there is shown an exemplary scenario 300B. The exemplary scenario 300B shows a Wi-Fi data packet 302 and a Bluetooth data packet 308. The Wi-Fi data packet 302 may include a header 304 and a payload 306. The Bluetooth data packet 308 may include a header 310 and a payload 312.

The second exemplary scenario is described in conjunction with elements from FIGS. 1 and 2. The CPU 202 of the electronic device 102b may be configured to receive a first content from the electronic device 102a using a first offline wireless network feature, such as Wi-Fi. The first content, for example, may be received as the Wi-Fi data packet 302. The CPU 202 of the electronic device 102b may be configured to detect the electronic device 102c to which the first content is to be communicated in an offline wireless network. The electronic device 102c may be located at a distance that is beyond an offline wireless communication range, such as maximum Bluetooth or Wi-Fi range as per their standard specifications, from the electronic device 102a. The CPU 202 of the electronic device 102b by use of the application 110b, may detect that a Bluetooth feature (or capability) is available in the electronic device 102c. In this case, data packets of a first network-type, such as the Wi-Fi data packet 302, may need to be encapsulated inside a second network-type, such as Bluetooth, used for communication of the first content. In certain scenarios, payload may be different based on a particular network standard. For example, Bluetooth data packet 308 may not able to encapsulate the complete Wi-Fi data packet 302 because the payload 312 of the Bluetooth data packet 308 can handle less payload than that of Wi-Fi. In this case, the CPU 202 may be configured to split the data packets of Wi-Fi to fit according to the Bluetooth standard payload by use of the application 110b. For example, the CPU 202 may be configured to split the payload 306 of the Wi-Fi data packet 302 to be accommodated as payloads 318 and 320 in a plurality of Bluetooth data packets 314A and 314B, as shown, for encapsulation. The plurality of Bluetooth data packets 314A and 314B may include headers 316A and 316B compatible for Bluetooth network standard type of communication. Thereafter, plurality of Bluetooth data packets 314A and 314B may then be communicated by the electronic device 102b (which acts as a proxy node by use of the application 110b) to the electronic device 102c. Thus, the application 110b of the electronic device 102b acts as a proxy or intermediate node to facilitate communication of the first content from the electronic device 102a (initially communicated as the Wi-Fi data packet 302) to the electronic device 102c (same first content received as plurality of Bluetooth data packets 314A and 314B after split and encapsulation).

Figure 4A:
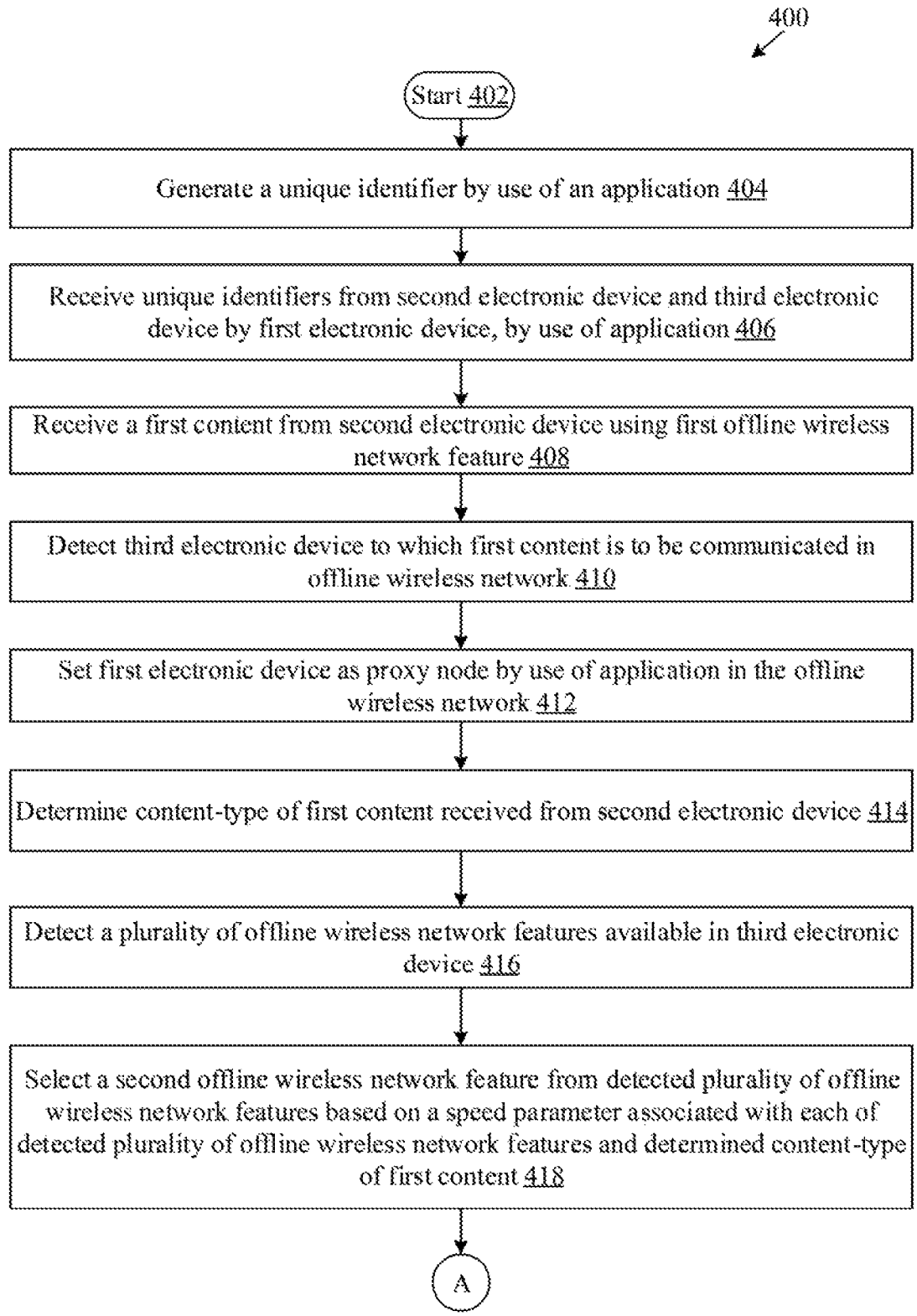
FIGS. 4A and 4B, collectively, depict a flow chart that illustrates an exemplary method for data communication by virtual network boosting using proxy nodes in wireless networks, in accordance with an embodiment of the disclosure.
Figure 4B:
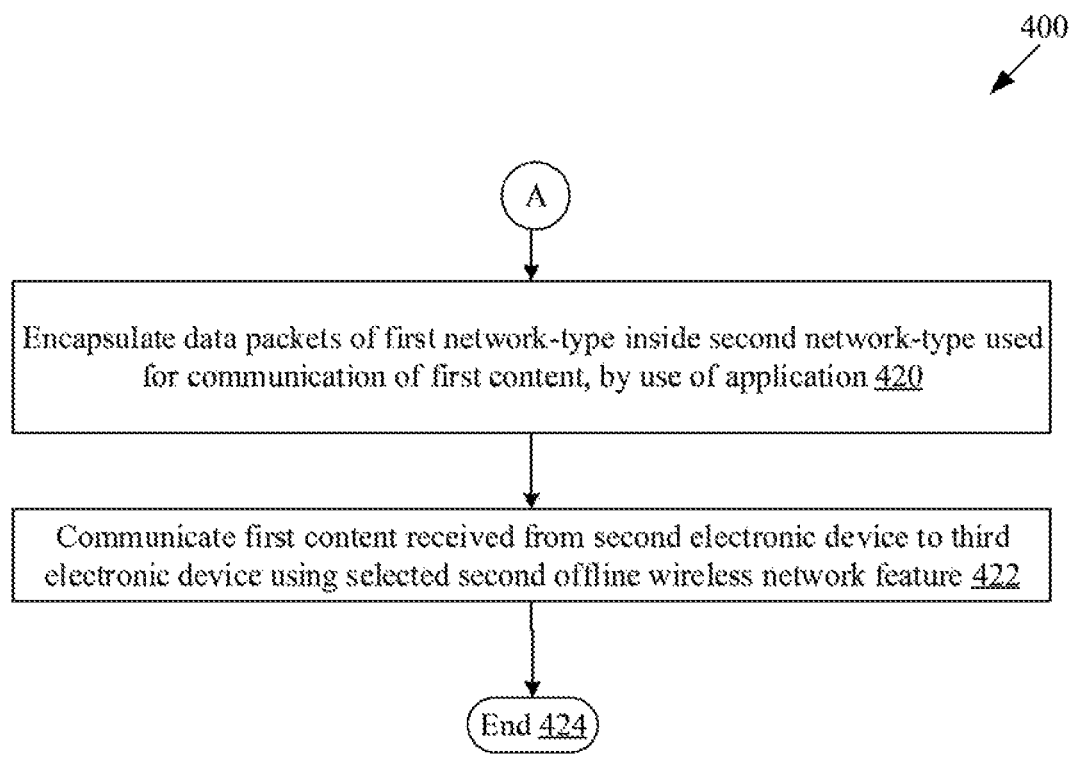

FIGS. 4A and 4B, collectively, depict a flow chart 400 that illustrate a method for offline data communication, in accordance with an embodiment of the disclosure. FIGS. 4A and 4B are described in conjunction with FIGS. 1, 2, and 3. As shown in FIG. 4A, the method of the flow chart 400 may be implemented in a first electronic device (such as the electronic device 102b). The flow chart 400 starts at 402 and proceeds to 404.

At 404, the first electronic device (such as the electronic device 102b) may generate a unique identifier, by use of the applications 110b. Similar to the first electronic device, the second electronic device (such as the electronic device 102a) and the third electronic device (such as the electronic device 102c) may also generate a unique identifier, by use of the applications 110a and 110c. The CPU 202 may be configured to generate the unique identifier, by use of the applications 110b.

At 406, unique identifiers of the second electronic device and the third electronic device may be received by the first electronic device (such as the electronic device 102b), by use of the application 110b. The CPU 202 may be configured to receive the unique identifiers of the second electronic device (such as the electronic device 102a) and the third electronic device (such as the electronic device 102c) by use of the application 110b. The unique identifiers may be received via the one or more transceivers 212. Each of the plurality of electronic devices may broadcast their unique identifiers in one or more offline wireless networks. In accordance with an embodiment, the electronic devices which are within an offline wireless communication range with each other share their unique identifiers with each other in the one or more offline wireless networks. For example, with reference to the FIG. 1, the second electronic device (such as the electronic device 102a) may receive the unique identifier of the first electronic device (such as the electronic device 102b) that is within the offline wireless communication range (for example, 40 meters). The second electronic device (such as the electronic device 102a) may not receive the unique identifier of the third electronic device (such as the electronic device 102c) that is located at a distance (for example, 80 meters), which is beyond the offline wireless communication range of the second electronic device (such as the electronic device 102a). Similarly, the third electronic device may be configured to receive the unique identifier of the first electronic device (such as the electronic device 102b). Similarly, as both the third electronic device and the second electronic device are within the offline wireless communication range of the first electronic device, the CPU 202 may be configured to receive both the unique identifiers of the second electronic device and the third electronic device, by use of the application 110b. One application, such as the application 110b may concurrently scan for a plurality of nearby devices using different offline wireless networks at the same time. For example, both the Bluetooth enabled and the Wi-Fi enabled devices may be scanned concurrently by the application 110b.

At 408, a first content may be received by the first electronic device (such as the electronic device 102b) from the second electronic device (such as the electronic device 102a) using a first offline wireless network feature, such as Bluetooth. The CPU 202 may be configured to receive the first content from the second electronic device, via the one or more transceivers 212. The received data packets of the first content may be temporarily stored in the reception buffers 208 in encrypted form.

At 410, the third electronic device (such as the electronic device 102c) to which the first content is to be communicated in an offline wireless network, may be detected by the first electronic device (such as the electronic device 102b). The CPU 202 may be configured to detect the third electronic device as the device to which the first content is to be communicated based on an analysis of the received first content. The received first content may also include an appended metadata, which comprise a unique identifier of an end recipient device (i.e. the third electronic device) to which the first content is to be communicated.

At 412, the first electronic device (such as the electronic device 102b) may be set as a proxy node by use of the application 110b in the offline wireless network. As the memory 204 of the first electronic device (such as the electronic device 102b) includes the unique identifier of the end recipient device, the CPU 202 may be configured to register and set itself as a proxy node, by use of the application 110b in the offline wireless network.

At 414, a content-type of the first content received from the second electronic device, may be determined. The CPU 202 may be configured to determine the content-type of the first content received from the second electronic device. The content-type may refer to audio, video, image, web content, or other audio-visual content, or other types of data.

At 416, a plurality of offline wireless network features available in the third electronic device, may be detected by the first electronic device (such as the electronic device 102b). The CPU 202 may be configured to detect the plurality of offline wireless network features available in the third electronic device (such as the electronic device 102c), by use of the application 110b. For example, the third electronic device may have both Bluetooth, Wi-Fi, and NFC enabled network features.

At 418, a second offline wireless network feature from the detected plurality of offline wireless network features may be selected to communicate the first content to the third electronic device. The selection of the second offline wireless network feature may be done based on a speed parameter associated with each of the detected plurality of offline wireless network features and the determined content-type of the first content. The CPU 202 may be configured to select the second offline wireless network feature, by use of the application 110b. The CPU 202 may determine that the second offline wireless network feature, for example, Wi-Fi network feature, may be suitable and the fastest network feature based on the determined content-type and device capabilities.

In certain scenarios, certain offline network feature, such as the fastest network feature, may be disabled in the third electronic device (such as the electronic device 102c). In such scenarios, the CPU 202 of the electronic device 102b may be configured to first establish communication with the third electronic device (such as the electronic device 102c) using an online wireless network. The communication with the third electronic device (such as the electronic device 102c) may be established using the online wireless network based on a failure status of the detection of the third electronic device (such as the electronic device 102c) for the fastest or other offline network feature, such as Wi-Fi network. For example, the failure status may occur for unregistered devices i.e. the devices not yet a part of an offline data communication service or when registered proxy nodes supporting the offline data communication are not switched on for certain offline network features, for example, Bluetooth or Wi-Fi. The CPU 202 of the electronic device 102b may be configured to turn on one of the plurality of offline wireless network features (such as Wi-Fi network) available in the third electronic device (such as the electronic device 102c), via the online wireless network, and then communicate the first content via the enabled offline wireless network feature. In other words, even if some intermediate proxy nodes or the end recipient device supporting the offline data communication are not switched on for Bluetooth or Wi-Fi, the SN application, such as the application 110b, can reach out to these proxy nodes from Internet and enable Bluetooth or Wi-Fi, and then can start offline network communications.

At 420, data packets of a first network-type may be encapsulated inside a second network-type used for communication of the first content, by use of the application 110b. The CPU 202 may be configured to encapsulate the data packets of the first network-type, for example Bluetooth-based data packets, inside a second network-type, for example, Wi-Fi data packets. The first network-type may correspond to the first offline wireless network feature, such as Bluetooth. The second network-type corresponds to the selected second offline wireless network feature used for further communication of the first content.

At 422, the first content received from the second electronic device may be communicated to the third electronic device using the selected second offline wireless network feature. The CPU 202 may be configured to communicate the first content to the third electronic device (such as the electronic device 102c). Thus, using the proxy node, the two electronic devices 102a and 102c, are able to communicate data even though the two electronic devices 102a and 102c are not in the offline wireless network range with each other. This may be referred to as a virtual network boosting, where the offline communication range or the coverage area is expanded, for example, doubled, without any additional hardware requirement, such as relay boosters, signal boosters, and the like, or without actual boosting of signals. Further, with one intermediate device, such as the first electronic device, between two end to end devices, the existing offline network technologies capacity can be doubled with respect to their current standards. The control may pass to end 424.

Figure 5:
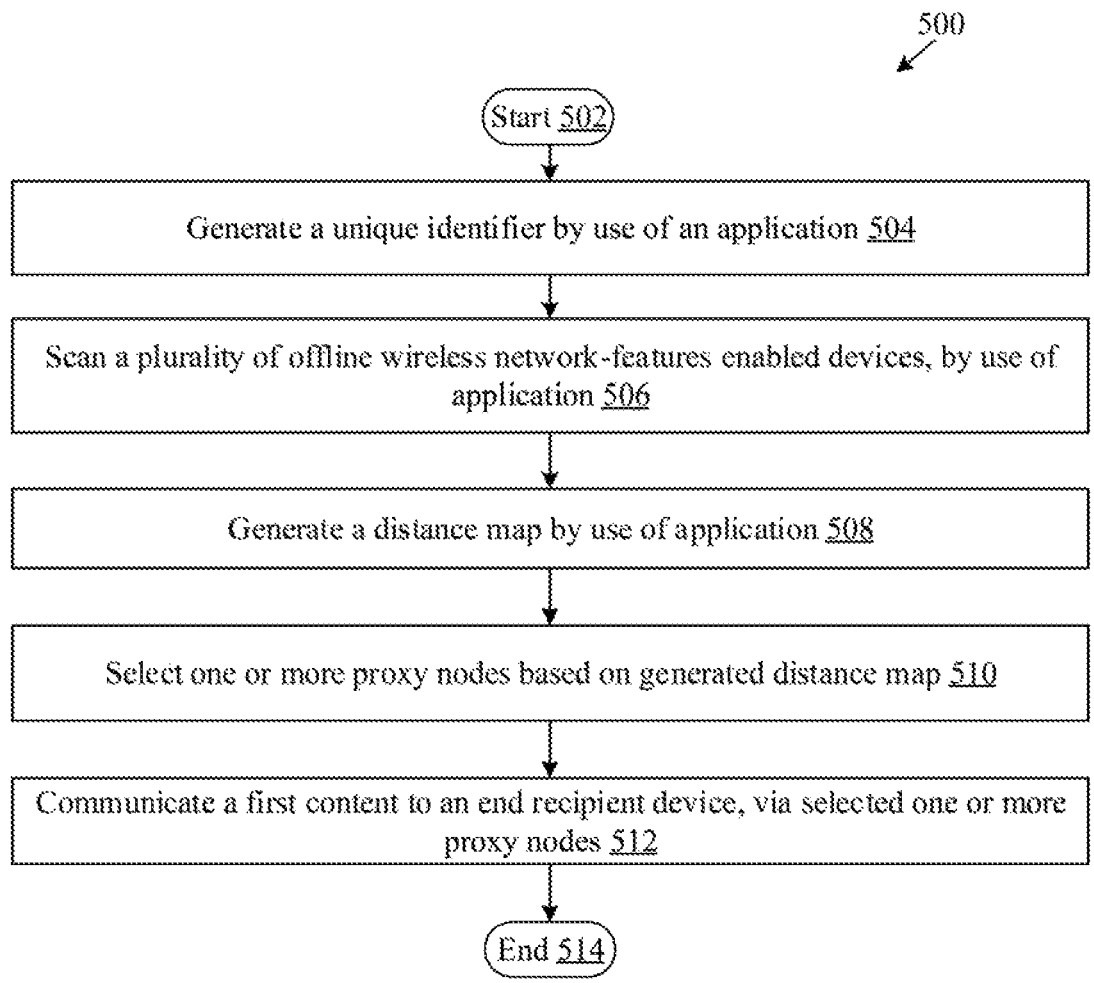
FIG. 5 depicts a flow chart that illustrate another exemplary method for data communication by virtual network boosting using proxy nodes in wireless networks, in accordance with an embodiment of the disclosure.

FIG. 5 is a flow chart 500 that illustrate a method for offline data communication, in accordance with an embodiment of the disclosure. FIG. 5 is described in conjunction with elements from the FIGS. 1, 2, and 3. As shown in FIG. 5, the method of the flow chart 500 may be implemented in the second electronic device (such as the electronic device 102a). The flow chart 500 starts at 502 and proceeds to 504.

At 504, a unique identifier may be generated by the electronic device 102a, by use of the application 110a. Similar to the electronic device 102a, each of the other electronic devices, such as the electronic devices 102b and 102c may also generate a corresponding unique identifier, by use of the applications 110b and 110c.

At 506, a plurality of offline wireless network-features enabled devices may be scanned by the electronic device 102a, by use of the application 110a. For example, nearby devices with Bluetooth, Wi-Fi, near field communication (NFC) enabled devices, may be concurrently searched by the electronic device 102a, by use of the application 110a. Alternatively stated, the application 110a allows concurrent search for the plurality of offline wireless network-features, and individual offline wireless network-feature may need not to be searched manually one by one. Other electronic devices, such as the electronic devices 102b to 102f, may also scan plurality of offline wireless network-features enabled devices in their vicinity by use of their respective applications 110b to 110f.

At 508, a distance map may be generated by the electronic device 102a, by use of the application 110a. The distance map may include a distance of the electronic device 102a with respect to other nearby electronic devices, such as the electronic device 102b, within the offline communication range of the electronic device 102a. The distance may be computed based on a signal strength detected from other nearby electronic devices at the time of the scan. Similarly, distance maps may be generated by each of the plurality of electronic devices, such as the electronic devices 102b to 102f. In accordance with an embodiment, each of the plurality of electronic devices, such as the electronic devices 102a to 102f, may share and sync their distance map with other nearby electronic devices within their offline communication range, by use of their respective applications 110a to 110f. Thus, the generated distance map in each of the plurality of electronic devices may be continuously or periodically updated. In some embodiments, the distance map may also include a number of devices (represented as unique identifiers) accessible to each of the plurality of electronic devices.

At 510, one or more proxy nodes may be selected based on the generated distance map. The electronic device 102a may be configured to select one or more proxy nodes to communicate a first content to an end recipient device, such as the electronic device 102c (FIG. 1) or the electronic device 102f (FIG. 3). An example of a selection of a single proxy node is shown and described in FIG. 1, where the electronic device 102a, based on the updated distance map, detects that the end recipient device, such as the electronic device 102c, is accessible to the electronic device 102b and also the electronic device 102a. Based on the updated distance map, the electronic device 102a may be configured to compute that an end-to end distance of a communication path from the electronic device 102a to the electronic device 102c is 80 meters, and that there is no other electronic device(s) that may be used as a proxy node with an end-to end distance less than the computed end-to end distance (i.e. 80 meters in this case). Thus, the electronic device 102a may be configured to identify and select the electronic device 102b as a proxy node to communicate the first content by a shortest communication path. An example of a selection of a plurality of proxy nodes is shown and described in FIG. 3, where the electronic device 102a, based on the updated distance map, detects that the end recipient device, such as the electronic device 102f, is accessible to two electronic devices 102d and 102e, as shown in TABLE 1. Further, based on the updated distance map, the electronic device 102a may be further configured to compute that a shortest end-to end distance of a first communication path (shown by dashed arrow marks in FIG. 3) from the electronic device 102a to the electronic device 102f is 90 meters, by use of two proxy nodes (such as the electronic devices 102b and 102d). Thus, the electronic device 102a may be configured to identify and select the electronic devices 102b and 102d as the proxy nodes to communicate the first content by the shortest communication path.

At 512, the first content may be communicated by the electronic device 102a to the end recipient device, such as the electronic device 102c (FIG. 1) or the electronic device 102f (FIG. 3), using the selected one or more proxy nodes. The electronic device 102a and the selected one or more proxy nodes may utilize a offline wireless network feature, such as Bluetooth, Wi-Fi, or the like, in each device to device communication of the first content using the selected one or more proxy nodes to deliver the first content to the end recipient device. The offline wireless network feature used in each device to device communication may be same as the previous device to device communication or different. The selected one or more proxy nodes, for example, the electronic devices 102b and 102d, may be configured to select a suitable and a fastest available offline wireless network feature to further communicate the first content. Thus, the selection of an offline wireless network feature by a proxy node may be done based on a speed parameter associated with available offline wireless network features and a content-type of the first content. The control may pass to end 514.

In accordance with an exemplary aspect of the disclosure, a system for offline data communication by virtual network boosting using proxy nodes in offline wireless networks, is disclosed. The system may include a first electronic device (such as the electronic device 102b (FIG. 1), which may comprise the CPU 202 (FIG. 2). The CPU 202 may be configured to receive a first content from a second electronic device (such as the electronic device 102a) using a first offline wireless network feature. The CPU 202 may be further configured to detect a third electronic device (such as the electronic device 102c) to which the first content is to be communicated in an offline wireless network. The third electronic device may be located at a distance that is beyond an offline wireless communication range from the second electronic device. The CPU 202 may be further configured to detect a plurality of offline wireless network features available in the third electronic device. The CPU 202 may be further configured to select a second offline wireless network feature from the detected plurality of offline wireless network features to communicate the first content to the third electronic device. The second offline wireless network feature may be selected based on a speed parameter associated with each of the detected plurality of offline wireless network features and a content-type of the first content. The CPU 202 may be further configured to communicate the first content received from the second electronic device to the third electronic device using the selected second offline wireless network feature.

In accordance with an exemplary aspect, various embodiments of the disclosure may provide another non-transitory computer readable medium and/or storage medium, having stored thereon, a set of instructions executable by a machine and/or a computer for offline data communication using proxy nodes in offline wireless networks. The set of instructions may cause the machine and/or computer (such as the electronic device 102b (FIG. 1)) to execute operations that comprise receipt of a first content from a second electronic device (such as the electronic device 102a) using a first offline wireless network feature. A third electronic device (such as the electronic device 102c) to which the first content is to be communicated in an offline wireless network, may be detected. The third electronic device may be located at a distance that is beyond an offline wireless communication range from the second electronic device. A plurality of offline wireless network features available in the third electronic device, may be detected. A second offline wireless network feature from the detected plurality of offline wireless network features, may be selected to communicate the first content to the third electronic device. The second offline wireless network feature may be selected based on a speed parameter associated with each of the detected plurality of offline wireless network features and a content-type of the first content. The first content received from the second electronic device may be communicated to the third electronic device using the selected second offline wireless network feature.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which, when loaded in a computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without deviation from the scope of the present disclosure. In addition, many modifications may be made to adapt a particular situation or material to the teachings of the present disclosure without deviation from its scope. Therefore, it is intended that the present disclosure not be limited to the particular embodiment disclosed, but that the present disclosure will include all embodiments falling within the scope of the appended claims.

What is claimed is:

1. A data communication system, comprising:
   a first electronic device that includes a first central processing unit (CPU); and
   a second electronic device that includes a second CPU, wherein
   said first CPU is configured to:
      determine said second electronic device includes each of a first unique identifier associated with said first electronic device and a second unique identifier associated with a third electronic device;
      generate a first distance map based on signal strength from said second electronic device, wherein said first distance map comprises distance information of said first electronic device to said second electronic device;
      receive a second distance map from said second electronic device, wherein
         said second distance map comprises distance information of said second electronic device to said third electronic device, and
         said third electronic device is at a distance greater than an offline wireless communication range of said first electronic device;
      update said first distance map based on said second distance map; and
      select, based on said updated first distance map and said determination, said second electronic device via which content is to be communicated to said third electronic device, and
   said second CPU is configured to:
      receive said content and said second unique identifier from said first electronic device based on a first offline wireless network feature associated with said first electronic device, wherein
         a second offline wireless network feature associated with said second electronic device is in a disabled state based on said reception of said content and said second unique identifier, and
         said first offline wireless network feature is different from said second offline wireless network feature;
      detect said third electronic device to which said content is to be communicated in an offline wireless network based on said second unique identifier;
      detect a plurality of offline wireless network features available in said third electronic device, wherein said plurality of offline wireless network features includes said first offline wireless network feature and said second offline wireless network feature;
      enable said second offline wireless network feature based on said detection of said plurality of offline wireless network features;
      select said enabled second offline wireless network feature from said plurality of offline wireless network features to communicate said content to said third electronic device, wherein said second offline wireless network feature is selected based on a speed parameter associated with each offline wireless network feature of said plurality of offline wireless network features and a content-type of said content; and
      communicate said content to said third electronic device based on said selected second offline wireless network feature.

2. The data communication system according to claim 1, wherein said second CPU is further configured to determine said content-type of said content.

3. The data communication system according to claim 1, wherein
   said second CPU is further configured to encapsulate a plurality of data packets of a first network-type inside a second network-type for said communication of said content, and
   said first network-type corresponds to said first offline wireless network feature and said second network-type corresponds to said second offline wireless network feature.

4. The data communication system according to claim 1, wherein said second CPU is further configured to register said second electronic device as a proxy node in said offline wireless network.

5. The data communication system according to claim 1, wherein said second CPU is further configured to establish a communication with said third electronic device via an online wireless network based on a failure status of said detection of said third electronic device in said offline wireless network.

6. The data communication system according to claim 5, wherein said second CPU is further configured to turn on one of said plurality of offline wireless network features available with said third electronic device via said online wireless network for said communication of said content.

7. The data communication system according to claim 1, wherein said second CPU is further configured to set said second electronic device as a proxy node in said offline wireless network for a two-way data exchange between said first electronic device and said third electronic device, based on a presence of said third electronic device beyond said offline wireless communication range from said first electronic device and based on an application in said second electronic device.

8. The data communication system according to claim 1, wherein said second CPU is further configured to generate a third unique identifier based on an application in said second electronic device.

9. A method for offline data communication, comprising:
   in a first electronic device that includes a first central processing unit (CPU):
      determining, by said first CPU, a second electronic device includes each of a first unique identifier associated with said first electronic device and a second unique identifier associated with a third electronic device;

generating, by said first CPU, a first distance map based on signal strength from said second electronic device, wherein said first distance map comprises distance information of said first electronic device to said second electronic device;

receiving, by said first CPU, a second distance map from said second electronic device, wherein
- said second distance map comprises distance information of said second electronic device to said third electronic device, and
- said third electronic device is at a distance greater than an offline wireless communication range of said first electronic device;

updating, by said first CPU, said first distance map based on said second distance map; and selecting, by said first CPU based on said updated first distance map and said determination, said second electronic device via which content is to be communicated to said third electronic device;

in said second electronic device that includes a second CPU:

receiving, by said second CPU, said content and said second unique identifier from said first electronic device based on a first offline wireless network feature associated with said first electronic device, wherein
- a second offline wireless network feature associated with said second electronic device is in a disabled state based on said reception of said content and said second unique identifier, and
- said first offline wireless network feature is different from said second offline wireless network feature;

detecting, by said second CPU, said third electronic device to which said content is to be communicated in an offline wireless network based on said second unique identifier;

detecting, by said second CPU, a plurality of offline wireless network features available in said third electronic device, wherein said plurality of offline wireless network features includes said first offline wireless network feature and said second offline wireless network feature;

enabling, by said second CPU, said second offline wireless network feature based on said detection of said plurality of offline wireless network features;

selecting, by said second CPU, said enabled second offline wireless network feature from said plurality of offline wireless network features to communicate said content to said third electronic device, wherein said second offline wireless network feature is selected based on a speed parameter associated with each offline wireless network feature of said plurality of offline wireless network features and a content-type of said content; and communicating, by said second CPU, said content to said third electronic device based on said selected second offline wireless network feature.

10. The method according to claim 9, further comprising determining, by said second CPU, said content-type of said content.

11. The method according to claim 9, further comprising encapsulating, by said second CPU, a plurality of data packets of a first network-type inside a second network-type for said communication of said content, wherein said first network-type corresponds to said first offline wireless network feature and said second network-type corresponds to said second offline wireless network feature.

12. The method according to claim 9, further comprising registering, by said second CPU, said second electronic device as a proxy node in said offline wireless network.

13. The method according to claim 9, further comprising establishing, by said second CPU, a communication with said third electronic device via an online wireless network based on a failure status of said detection of said third electronic device in said offline wireless network.

14. The method according to claim 13, further comprising turning on, by said second CPU, one of said plurality of offline wireless network features available with said third electronic device via said online wireless network for said communication of said content.

15. The method according to claim 9, further comprising setting, by said second CPU, said second electronic device as a proxy node in said offline wireless network for a two-way data exchange between said first electronic device and said third electronic device, based on a presence of said third electronic device beyond said offline wireless communication range from said first electronic device and based on an application in said second electronic device.

16. The method according to claim 9, further comprising generating, by said second CPU, a third unique identifier based on an application in said second electronic device.

* * * * *